United States Patent [19]

Swift et al.

[11] 4,251,465

[45] Feb. 17, 1981

[54] PROCESS FOR PREPARING ALKYLDIMETHYLAMINES

[75] Inventors: Harold E. Swift, Gibsonia; Robert A. Innes, Monroeville, both of Pa.; Phillip Adams, Murray Hill, N.J.

[73] Assignees: Gulf Research & Development Company, Pittsburgh, Pa.; Kewanee Industries, New York, N.Y.

[21] Appl. No.: 108,645

[22] Filed: Dec. 31, 1979

[51] Int. Cl.$^3$ .............................................. C07C 85/06
[52] U.S. Cl. ................................... 564/479; 252/463; 252/465; 564/480
[58] Field of Search ........... 260/583 R, 583 H, 585 B; 252/463, 465

[56] References Cited

U.S. PATENT DOCUMENTS 4,138,437   2/1979   Strauss et al. .................... 260/583 R

FOREIGN PATENT DOCUMENTS 2709864   8/1978   Fed. Rep. of Germany ...... 260/583 R Primary Examiner—John Doll

[57] ABSTRACT

A process for preparing alkyldimethylamines which comprises passing through a fixed bed, containing a copper catalyst and, optionally, chromium oxide, mounted on magnesium aluminate spinel support, dimethylamine and an alcohol or mixture of alcohols.

19 Claims, No Drawings

PROCESS FOR PREPARING ALKYLDIMETHYLAMINES

BACKGROUND OF THE INVENTION

1. Field of the Invention

This invention relates to a process for reacting dimethylamine with an alcohol or mixture of alcohols to obtain an alkyldimethylamine while substantially decreasing the formation of undesired byproduct alkylmonomethylamine which comprises passing dimethylamine and said alcohol through a fixed bed containing copper, and optionally chromium oxide, mounted on magnesium aluminate spinel.

2. Description of the Prior Art

The reaction of fatty alcohols with dimethylamine, to yield the corresponding alkyldimethylamines has been known for many years. The reaction has been carried out in the liquid and vapor phase, at atmospheric or higher pressures, generally over a copper- or nickel-containing catalyst in the presence of hydrogen. Both stirred-autoclave and fixed-bed type reactors have been employed. In U.S. Pat. No. 3,223,734 dodecyl alcohol was reacted with dimethylamine in the presence of Raney Nickel to yield dodecyldimethylamine. The tertiary amine assay was only 69.5 percent. In U.S. Pat. No. 3,366,687 dimethylamine was reacted with various alcohols in the liquid phase in the presence of hydrogen over a fixed-bed of barium-copper-chromite catalyst. Yields of alkyldimethylamine were less than 75 percent.

More recently, German applications Nos. 2,749,064; 2,749,065 and 2,749,066 disclosed the use of copper on an alumina support promoted with rhenium, molybdenum, tungsten, zinc and chromium oxides. The reported yields of dimethyldodecylamine were less than 85 percent. U.S. Pat. No. 4,138,437 discloses a process for carrying out the reaction in the liquid phase over a copper-chromium oxide catalyst wherein the liquid alcohol is reacted with a circulating gaseous mixture containing hydrogen and 1–20 percent by volume dimethylamine to obtain up to 93.5 percent yield of dodecyldimethylamine.

German application 2,709,864 claims a method for preparing tertiary aliphatic amines by reacting an alcohol and dimethylamine over a catalyst containing copper (II) oxide, an alkali and/or alkaline earth metal oxide, and/or chromium (III) oxide. In accordance with the method claimed, the reaction may be carried out in a fixed-bed or stirred-autoclave reactor and the weight ratio of copper (II) and chromium (III) oxides to alkali and alkaline earth metal oxide can range between 1 to 0.002 and 1 to 0.1. Example 1 of this application employs a catalyst containing 1.0 percent Na$_2$O, while the six other examples employ catalysts containing 0.1 percent Na$_2$O or none at all. In Example 1, the yield of dodecyldimethylamine was only 82 percent. The yield of alkyldimethylamines exceeded 90 percent in the other examples. Thus, there is nothing in the application to show that the use of more than 0.1 percent alkali is advantageous.

Similar work is reported in an article published by A. Baikar and W. Richarz in Ind. Eng. Chem. Prod. Res. Dev., 16, 261–265 (1977). The authors employ a catalyst containing CuO (25 percent), Cr$_2$O$_3$ (1 percent), Na$_2$O (0.1 percent) SiO$_2$ (70 per cent), and H$_2$O (about 4 percent). It is stated that in the vapor phase fixed-bed process optimal results are obtained with a dimethylamine to alcohol molar ratio of 5.5 and that a 92–96 percent yield of dodecydimethylamine is obtained. No mention is made of the formation of alkylmonomethylamines.

We have found upon repeating this experiment that the type of chromatographic column used by Baikar and Richarz does not separate dodecylmonomethylamine from dodecyldimethylamine. With a 10 percent carbowax 20 M+2 percent KOH column we have shown that three to five weight percent of the product identified by Baikar and Richarz as dodecyldimethylamine is actually alkylmonomethylamine.

This is a very significant finding from an industrial standpoint because the corresponding alkylmonomethyl- and alkyldimethylamines have very close boiling points and are difficult to separate by distillation. The presence of too much of the alkylmonomethylamine impurity can cause problems in down-stream processes utilizing the alkyldimethylamine product. For example, when the alkyldimethylamine is reacted with benzyl chloride to make an alkyldimethylbenzylchloride solution, the impurity will be converted to alkylmethyldibenzyl chloride altering the properties of the final product.

SUMMARY OF THE INVENTION

The invention defined and claimed herein relates to an improvement in a process wherein an alcohol or mixture of alcohols is reacted with dimethylamine in the presence of a copper catalyst, and optionally chromium oxide, to obtain alkyldimethylamine by passing said reactants through a fixed bed of such catalyst which comprises substantially decreasing the formation of byproduct alkylmonomethylamine by passing said reactants through said catalyst bed wherein said catalyst is mounted on magnesium aluminate spinel.

BRIEF DESCRIPTION OF THE INVENTION

The process defined and claimed herein is effected by passing the reactants, alcohol and dimethylamine, preferably in the vapor phase, through a fixed bed catalyst bed containing a copper catalyst, and optionally chromium oxide, mounted on magnesium aluminate spinel.

The alcohols that can be used herein can be defined by the following structural formula:

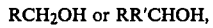

RCH$_2$OH or RR'CHOH, wherein R and R', the same or different, can be a straight or branched chain alkyl or alkenyl group having from four to 20 carbon atoms, preferably from eight to 18 carbon atoms. Specific examples of alcohols falling within the above definition include 1-octanol, 1-decanol, 1-dodecanol, 1-tetradecanol, 1-hexadecanol, n-nonanol, 2-methyl-1-heptanol, 2-methyl-1-dodecanol, 9-octadecen-1-ol, 2-ethyl-1-hexanol, 2-octanol, etc.

Specific examples of alkyldimethylamines resulting from the reaction of the above-identified alcohols with the dimethylamine include octyldimethylamine, dodecyldimethylamine, tetradecyldimethylamine, hexadecyldimethylamine, nonyldimethylamine, 2-methylheptyldimethylamine, 9-octadecenyldimethylamine, 2-ethylhexyldimethylamine, 1-methylheptyldimethylamine, etc. The undesired byproduct alkylmonomethylamines that can also result from the reaction will obviously be identical to the desired alkyldimethylamine except that it will carry but one methyl substituent thereon.

The reactant dimethylamine and the reactant alcohol are introduced into the reaction zone in a molar ratio ranging from about 3:1 to about 1:1, preferably about 2:1 to about 1:1.

In the process of this invention the reactants are passed through a fixed catalyst bed, preferably in the vapor phase, at a liquid hourly space velocity (volume of liquid alcohol per volume of catalyst per hour) of about 0.05 to about 5.0, preferably about 0.1 to about 2.0, while maintaining a temperature therein of about 150° to about 350° C., preferably about 200° C. to about 275° C., and a total pressure of about atmospheric (ambient) to about 100 pounds per square inch gauge (about 0 to about 690 kPa), perferably about atmospheric to about 15 pounds per square inch gauge (about 0 to about 103 kPa). A gaseous diluent, such as nitrogen or hydrogen, can also be introduced into the reaction zone, together with the reactants, to aid in maintaining a vapor phase therein. Hydrogen is preferred for such purpose since it additionally aids in prolonging catalyst life and increases selectivity. If such diluents are used the molar ratios of total diluent to alcohol can be in the range of about 1:1 to about 50:1, preferably about 2:1 to about 10:1.

The catalyst must be composed of magnesium aluminate spinel upon which is mounted copper and, optionally, chromium oxide, wherein the amount of copper will be in the range of about five to about 30 weight percent, perferably about 10 to about 25 weight percent, and chromium oxide can be in the range of about zero up to about five weight percent, preferably about 0.5 to about two weight percent.

In order to substantially decrease the formation of undesired byproduct alkylmonomethylamine it is absolutely critical that the metal component(s) of the catalyst system be mounted on a magnesium aluminate spinel support. Magnesium aluminate spinel, both natural and synthetic, is old and well known, for example, in U.S. Pat. No. 3,842,132 to Kehl et al. In general the magnesium aluminate spinel used herein can be defined by the formula $Mg_aAl_bO_4$, wherein a has a value of about 1 and b has a value of about 2, and will have surface areas in the range of about 10 to about 250 $m^2/g$, preferably about 40 to about 200 $m^2/g$, a mean pore diameter of about 50 to about 250 A, and a mesh size ranging from about U.S. No. 3 to about U.S. No. 40, preferably about U.S. No. 10 to about U.S. No. 30. The major peaks in the X-ray diffraction pattern of magnesium aluminate spinel are shown in Table A below.

TABLE A

| d(A) | Relative Intensities |
|------|---------------------|
| 4.67 | 18 |
| 2.86 | 10 |
| 2.44 | 100 |
| 2.02 | 72 |
| 1.56 | 20 |
| 1.43 | 76 |

The catalyst employed herein can be prepared in any suitable manner. For example, the magnesium aluminate spinel, as defined above, is impregnated at ambient conditions with a selected amount of a water-soluble salt of copper and, if used, a selected amount of a water-soluble salt of chromium. Specific examples of such salts that can be used include $Cu(NO_3)_2.3H_2O$, $Cu(NO_3)_2.6H_2O$, $CuCl_2.2H_2O$, $CuCl_2$, $Cu(CHO)_2$, $Cu(C_2H_3O_2).H_2O$, $Cr(NO_3)_3.9H_2O$, $Cr(Cl_3).10H_2O$, $Cr(C_2H_3)_2)_3.H_2O$, etc. The impregnated catalyst is dried and then calcined in air at ambient pressure and a temperature in the range of about 200° to about 500° C. for about 15 minutes to about 24 hours. At this stage each of the metals will be in their oxide state. In order to activate the catalyst, that is, convert the copper oxide to elemental copper, the catalyst can be contacted with hydrogen at a temperature of about 150° to about 300° C. for about 15 minutes to about 24 hours. Chromium oxide, if used, will remain in its oxide state ($Cr_2O_3$). The mesh size of the final catalyst will be in the range of about U.S. No. 3 to about U.S. No. 40, preferably about U.S. No. 10 to about U. S. No. 30. If hydrogen is used as a diluent the hydrogen pretreatment may be omitted, for in such case the desired reduction will occur in situ.

The desired alkyldimethylamine product can be recovered from the reaction product in any suitable manner. In one procedure that can be used to recover the desired product, the effluent from the reaction zone is passed through a condenser to cool the reaction product to about 30° to about 150° C. Hydrogen, if used, unreacted dimethylamine and water vapor are removed overhead. The condensed liquid product is then sent to a distillation stage wherein the desired alkyldimethylamine product is separated from heavier products, such as dialkylmethylamines.

DESCRIPTION OF PREFERRED EMBODIMENTS

A series of runs was carried out wherein dimethylamine and 1-dodecanol were passed downwardly in vapor phase over a number of catalysts. One of the catalysts was composed of a magnesium aluminate spinel ($MgAl_2O_4$) carrying 22.0 weight percent, based on the weight of the catalyst, of CuO and 1.0 weight percent, based on the total weight of the catalyst, of $Cr_2O_3$, which was prepared as follows. A 3375 gram portion of $Al(NO_3)_3.9H_2O$ was dissolved in eight liters of water at ambient conditions, while 1152 grams of $Mg(NO_3)_2.6H_2O$ was dissolved in eight liters of water. The two solutions were combined and then slowly added to five liters of water in a stirred mixing tank. At the same time 13,200 cubic centimeters of concentrated ammonium hydroxide was slowly added to the mixing tank, at a rate sufficient to maintain a pH of 10.0. A precipitate formed during the above addition. The resulting slurry was filtered in a filter crock and the recovered precipitate was washed with 10 liters of distilled water in two five-liter increments. The wet cake was placed in an oven wherein it was maintained overnight at a temperature of 120° C. A portion of the latter product was crushed and sieved to obtain 500 cubic centimeters of 10–20 mesh material which was then calcined overnight at 500° C. to obtain a material which was shown by X-ray diffraction and quantitative analysis to be the magnesium aluminate spinel $MgAl_2O_4$. The calcined material was impregnated with 328 cubic centimeters of an aqueous solution containing $Cu(NO_3)_2.3H_2O$ equivalent to 113.99 grams of CuO and $Cr(NO_3).9H_2O$ equivalent to 5.19 grams of $Cr_2O_3$. The impregnated material was oven dried overnight at 120° C. and calcined in air for one hour at 400° C. The resulting catalyst carried 22 weight percent CuO and one weight percent $Cr_2O_3$ based on the catalyst weight.

A second catalyst was prepared composed of Davison Chemical Co. Grade 59 silica gel ($SiO_2$) carrying 22 weight percent CuO and one weight percent $Cr_2O_3$. In perparing the catalyst 199.0 grams of 10 to 20 mesh silica gel were impregnated with 275 cubic centimeters of an aqueous solution containing 172.24 grams of Cu(NO$_3$)$_2$.3H$_2$O and 13.71 grams of Cr(NO$_3$)$_3$.9H$_2$O, the impregnated material was oven dried overnight at 120° C. and then calcined in air for one hour at 400° C.

Finally, a catalyst composed of 1/16-inch extrudates made of commercial grade gamma alumina (Al$_2$O$_3$) carrying 22 weight percent of CuO and one weight percent Cr$_2$O$_3$ was prepared. This was done by impregnating the 187.0 grams of such extrudates with 160 cubic centimeters of an aqueous solution containing 161.96 grams of Cu(NO$_3$)$_2$.3H$_2$O and 12.76 grams of Cr(NO$_3$)$_3$.9H$_2$O, oven drying overnight at 120° C. and then calcining in air at 400° C. for one hour.

The reactions herein were carried out in a 43-inch (109 centimeters) long, stainless steel, tubular, fixed-bed reactor having an internal diameter of ⅞ inch (2.22 centimeters) and an external diameter of 1.0 inch (2.54 centimeters). The reactor was equipped with a ¼-inch (0.64 centimeter) O.D. axial thermowell in which thermocouples were positioned to measure temperatures within the catalyst bed. The reactor was charged in each case with 100 cubic centimeters of one of the catalyst prepared above to form a catalyst bed therein having a length of 11 inches (28 centimeters). Quartz chips were positioned above and below the catalyst bed.

The catalysts were reduced at ambient pressure and a temperature of 230° C. for one hour in hydrogen prior to each run. In each of the runs a stream containing hydrogen, dimethylamine and 1-dodecanol in a molar ratio of 5:2:1 was passed in vapor phase downwardly through the catalyst bed at selected liquid (alcohol) hourly space velocities while maintaining ambient pressure and a temperature of 230° C. therein over a period of 16 hours. The gases leaving the reactor were passed through a heated transfer line to a separator maintained at 40° to 60° C. and the liquid products obtained therein were analyzed by gas chromatography. The results obtained are set forth below in Table I.

TABLE I

| Run No. | Support | Liquid Hourly Space Velocity | Dodecyl-dimethyl-amine | Dodecyl-monomethyl-amine | Unreacted 1-dodecanol | Didodecyl-methyl-amine | Unidentified Material |
|---|---|---|---|---|---|---|---|
| 1 | Silica Gel | 0.66 | 90.3 | 3.5 | 1.5 | 2.8 | 1.9 |
| 2 | Silica Gel | 1.09 | 86.7 | 3.0 | 4.9 | 3.5 | 1.9 |
| 3 | Alumina | 0.33 | 81.8 | 3.5 | 0.1 | 9.7 | 4.9 |
| 4 | Alumina | 1.09 | 68.8 | 0.8 | 21.8 | 7.4 | 1.7 |
| 5 | MgAl$_2$O$_4$ | 0.66 | 92.4 | 0.6 | 3.0 | 2.1 | 1.9 |
| 6 | MgAl$_2$O$_4$ | 1.09 | 89.0 | 0.6 | 6.3 | 2.1 | 2.0 |

The data in Table I clearly illustrates the advantages of using a catalyst herein mounted on a magnesium aluminate spinel support. In each of Runs Nos. 1 and 2 wherein the catalyst was mounted on a silica gel support a large amount of the undesired byproduct dodecylmonomethylamine was obtained. Similar undesired results were obtained with an alumina support in Run No. 3. Although a relatively small amount of dodecylmonomethylamine was formed with the alumina support in Run No. 4, the conversion of alcohol was unacceptably low and the selectivity to dodecyldimethylamine was poor. In each of Runs Nos. 5 and 6 using a magnesium aluminate spinel support, good conversions of alcohol were obtained with excellent selectivities to dodecyldimethylamine. At the same time there was a sharp decrease in the amount of dodecylmonomethylamine produced.

Obviously, many modifications and variations of the invention, as hereinabove set forth, can be made without departing from the spirit and scope thereof, and therefore only such limitations should be imposed as are indicated in the appended claims.

We claim:

1. In a process wherein an alcohol or mixture of alcohols is reacted with dimethylamine in the presence of a copper catalyst to obtain alkyldimethylamine or alkenyldimethylamine by passing said reactants through a fixed bed of such catalyst, the improvement which comprises substantially decreasing the formation of byproduct alkylmonomethylamine by passing said reactants through a fixed bed containing said catalyst mounted on a magnesium aluminate spinel.

2. The process of claim 1 wherein the molar ratio of said reactant amine to said reactant alcohol is in the range of about 3:1 to about 1:1.

3. The process of claim 1 wherein the molar ratio of said reactant amine to said reactant alcohol is in the range of about 2:1 to about 1:1.

4. The process of claim 1 wherein the amount of copper present is in the range of about five to about 30 weight percent.

5. The process of claim 1 wherein the amount of copper present is in the range of about 10 to about 25 weight percent.

6. The process of claim 5 wherein Cr$_2$O$_3$ is also present in an amount in the range up to about five weight percent.

7. The process of claim 5 wherein Cr$_2$O$_3$ is also present in an amount in the range of about 0.5 to about two weight percent.

8. The process of claim 1 wherein a diluent selected from the group consisting of nitrogen and hydrogen is also present in the reaction mixture.

9. The process of claim 8 wherein said diluent is hydrogen.

10. The process of claim 1 wherein the charge additionally contains hydrogen such that the molar ratio of hydrogen to alcohol is in the range of about 1:1 to about 50:1.

11. The process of claim 1 wherein the charge additionally contains hydrogen such that the molar ratio of hydrogen to alcohol is in the range of about 2:1 to about 10:1.

12. The process of claim 1 wherein said reactant alcohol has from four to 20 carbon atoms.

13. The process of claim 1 wherein said reactant alcohol has from eight to 18 carbon atoms.

14. The process of claim 1 wherein said reactant alcohol is 1-dodecanol.

15. The process of claim 1 wherein the liquid (alcohol) hourly space velocity is about 0.05 to about 5.0.

16. The process of claim 1 wherein the liquid (alcohol) hourly space velocity is about 0.01 to 2.0.

17. The process of claim 1 wherein the reaction temperature is in the range of about 150° to about 350° C.

18. The process of claim 1 wherein the reaction temperature is in the range of about 200° to about 275° C.

19. The process of claim 1 wherein said reactants are passed through said catalyst bed in vaopr phase.

* * * * *